United States Patent
Witt et al.

(10) Patent No.: US 8,705,607 B1
(45) Date of Patent: Apr. 22, 2014

(54) NON-DISRUPTIVE ADAPTER EQUALIZER COEFFICIENT UPDATE METHOD FOR ACTIVE LINKS

(75) Inventors: Kevin James Witt, Colorado Springs, CO (US); Gregory Arthur Tabor, Colorado Springs, CA (US); Kurt Marshall Schwemmer, Colorado Springs, CO (US); John Matthew Adams, Colorado Springs, CO (US)

(73) Assignee: Maxim Integrated Products, Inc., San Jose, CA (US)

( * ) Notice: Subject to any disclaimer, the term of this patent is extended or adjusted under 35 U.S.C. 154(b) by 139 days.

(21) Appl. No.: 13/404,753

(22) Filed: Feb. 24, 2012

(51) Int. Cl.
*H03K 5/159* (2006.01)

(52) U.S. Cl.
USPC .......................................................... 375/233

(58) Field of Classification Search
USPC ........... 375/233, 229, 231, 232; 708/322, 323
See application file for complete search history.

(56) References Cited

U.S. PATENT DOCUMENTS

| | | | |
|---|---|---|---|
| 2009/0086810 A1* | 4/2009 | Hidaka | 375/234 |
| 2013/0010810 A1* | 1/2013 | Pelet | 370/479 |
| 2013/0117621 A1* | 5/2013 | Saraiya et al. | 714/748 |

* cited by examiner

*Primary Examiner* — Khai Tran
(74) *Attorney, Agent, or Firm* — North Weber & Baugh LLP

(57) ABSTRACT

Various embodiments of the innovation provide adaptive equalization training for a receiver in a communication system. In certain embodiments, the receiver's coefficients are re-optimized while links are active and initialized.

19 Claims, 4 Drawing Sheets

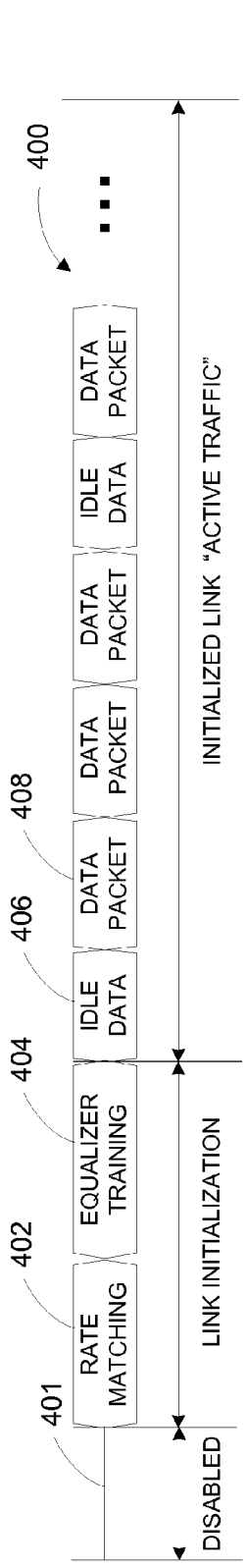
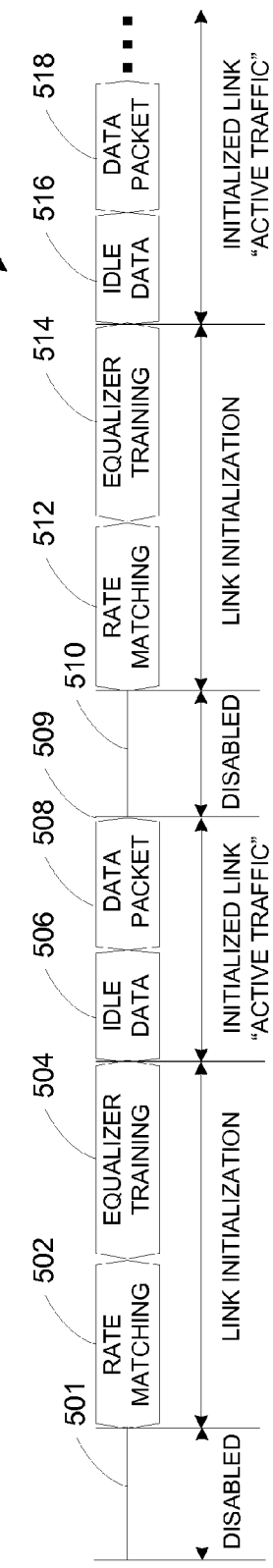
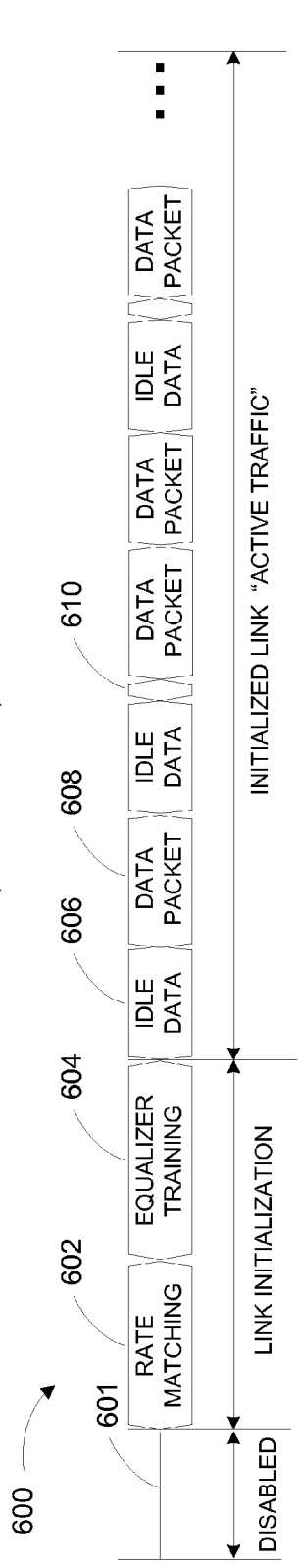
FIGURE 4 (PRIOR ART)
FIGURE 5 (PRIOR ART)
FIGURE 6

NON-DISRUPTIVE ADAPTER EQUALIZER COEFFICIENT UPDATE METHOD FOR ACTIVE LINKS

BACKGROUND

A. Technical Field

The present invention relates generally to adaptive equalizer training in communication systems, and more particularly, to the implementation of adaptive equalization on active, initialized links.

B. Background of the Invention

High-speed serial protocols like Serial Attached SCSI (SAS) implement adaptive equalizer training during link initialization. Channel characteristics change over time due to environmental factors such as temperature, fluctuations in power supply voltage, and unintended interactions with surrounding circuitry resulting in signal degradation. Equalizers train to remove intersymbol-interference (ISI) caused by dielectric loss, connector loss, return loss, distortions, and other channel characteristics that alter a signal from the point of transmission to the receiver. As speeds of modern communication systems increase there is a meaningful importance in achieving low bit-error ratios (BER) and maintaining signal integrity.

Traditional control algorithms do not permit an opportunity to re-optimize the equalizer after a link is established without performing a link reset and a new link initialization sequence. This reinitialization requires significant time to complete and is disruptive at the system level.

Equalizers operating in large systems with many subsystems undergo significant changes in thermal and supply voltage operating points as the system is brought from a non-operational to fully operational state. In addition, switching to power saving modes induces a change in thermal operating point. It is likely that a receiver equalized at one temperature and voltage will be non-optimal at a significantly different environmental operating point. These environmental fluctuations can alter channel characteristics after equalization coefficients have already been set, leaving the system sub-optimally or improperly equalized.

Therefore, it is desirable to be able to re-optimize the receiver coefficients on an active link when environmental changes take place for any given hardware to achieve optimal link margin without the need for a disruptive re-initialization.

SUMMARY OF THE INVENTION

Various embodiments of the invention allow for adaptive equalization training in a communication system. In particular, certain embodiments of the invention support receiver re-optimization of an active, initialized communications link, so that variations in the characteristics of the channel may be compensated for at the receiver during its operation. Examples of sources of these variations include thermal shifts, changes in power supply voltage, or degradation in the quality of the channel.

The re-optimization process allows a receiver to update its coefficients or signal shaping variables to compensate for these changes in signal quality without having to shut down an active link and initiate the same initialization as performed during start-up. One skilled in the art will recognize that this receiver re-optimization process may be modified to optimally function in different environments. In one embodiment, the receiver re-optimization process may be triggered by a particular event such as a thermal shift or a bit error rate crossing a threshold level. In another embodiment, the receiver re-optimization process may be intermittently scheduled to be performed during idle times in a link.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4 is an exemplary prior art equalization sequence.

FIG. 5 is an exemplary prior art adaptive equalization sequence.

FIG. 6 is an exemplary adaptive equalization sequence according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
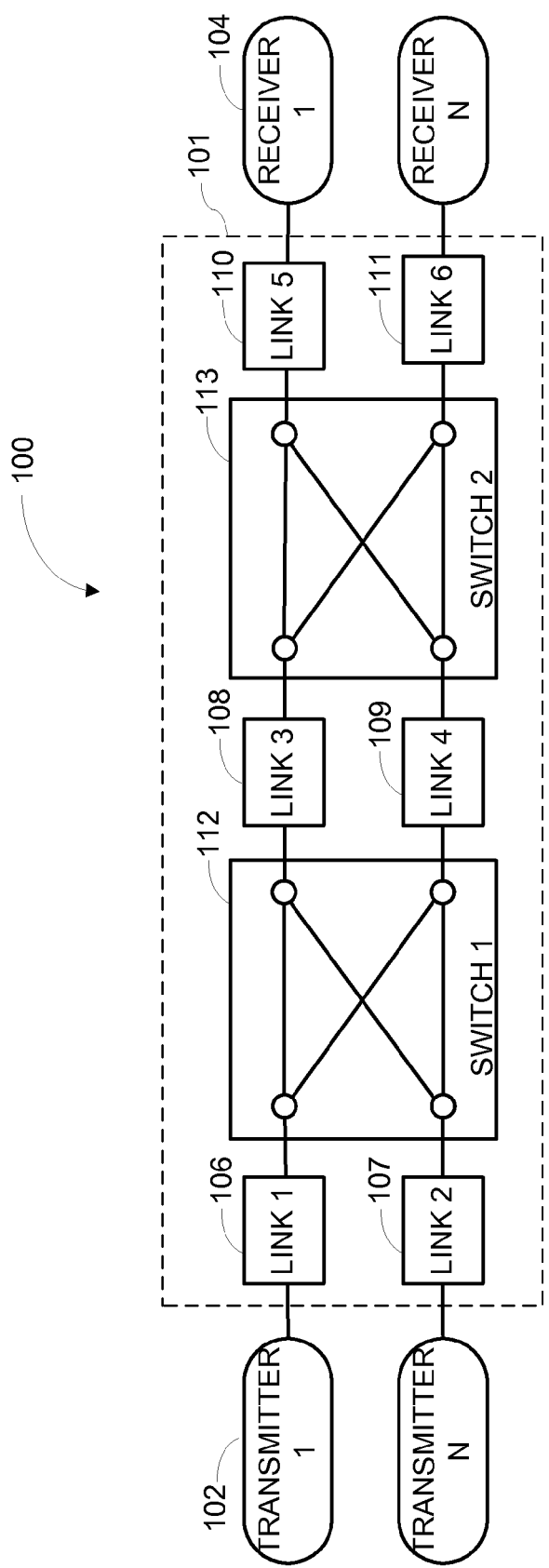
FIG. 1 is a general illustration of a switch fabric communications topology according to various embodiments of the invention.

FIG. 1 generally illustrates a switch fabric communications topology according to various embodiments of the invention. Fabric 101 is a switch fabric communications topology that enables initiators 102 to communicate to all targets 104. On a switch fabric such as this, sharing the infrastructure and link resources is typically done by time division multiplexing on a demand basis. Individual links 106-111 are connected by switches 112 and 113 and are typically initialized and optimized at power-up for channel characteristics present at that time. Initiator-to-target communications are routed through the fabric when needed and released after completion. Although this invention is described in the context of a switch fabric it also pertains to simpler communication topologies, for example a single bi-directional link between an initiator and a target.

Figure 2:
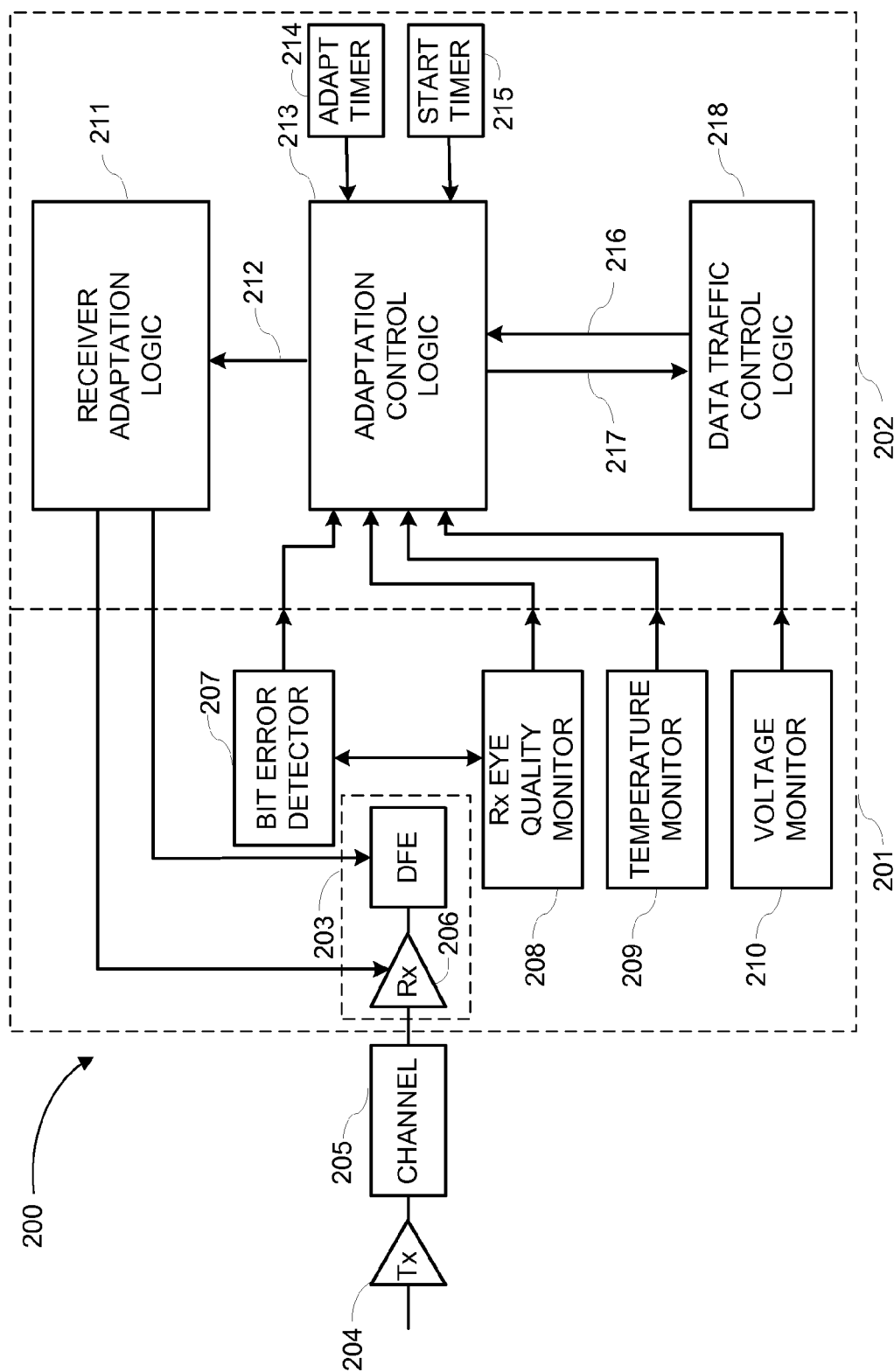
FIG. 2 is a block diagram of an adaptive equalizer according to various embodiments of the invention.

FIG. 2 is a block diagram of an adaptive equalizer according to various embodiments of the invention. Adaptation control logic 213 is coupled to data traffic control logic 218, receiver adaptation logic 211, and any number of monitors 207-210 designed to monitor environmental parameters and system performance. Adaptation control logic 213 is also coupled to an internal or external timers, such as adapt timer 214 or start timer 215, which may be used to trigger and control adaptive equalization training.

The adapt timer 214 is used to determine whether an adaptive equalization training interval has terminated. The start timer 215 periodically triggers an adaptation cycle and notifies the adaptation control logic 213.

Additionally, each monitor 207-210 may generate a trigger to initiate an adaptive equalization training request. Training requests to re-adapt the receiver 200 may be invoked by environmental changes, such as thermal shifts, changes in power supply voltage, or detection of degradation in the quality of channel 205, which may come in the form of slowly time-varying changes.

The timing of the actual adaptive equalization training is based on either a trigger event by monitors 207-210 or a timer event by start timer 215 starting an adaptation cycle. In both cases, adaptation control logic 213 sends a stop traffic request 217 to data traffic control logic 218. In return, the adaptation control logic 213 receives a traffic stopped signal 216 from data traffic control logic 218, indicating that data traffic has been stopped.

Upon receiving the traffic stopped signal 216, adaptation control logic 213 sends an adaptation request 212 to the receiver adaptation logic 211. The receiver adaptation logic 211 then performs adaptive equalization training on the receiver device 203.

The data traffic control logic 218 detects a pending connection requests and may accept a request within a predetermined time. For example, in a negotiated connection where an open frame is received from the other side of the link to initiate traffic, 1 ms is a typical specified time to accept the connection request. The data traffic control logic 218 gives data traffic priority, but it looks for idle times on the link so that traffic can be stopped and adaptive training can be initiated.

The data traffic control logic 218 generates the traffic stopped signal 216 if a stop traffic request 217 is pending and the link is idle and there are no pending connection requests. Once receiver re-optimization is active, the data traffic control logic 218 holds off any connection requests until the adapt timer 214 is complete. In certain embodiments, the typical interval between adaptation cycles is 500 ms, while the time for receiver re-optimization is only 150 us. Therefore, about every 0.5 seconds the data traffic control logic 218 looks for an opportunity to carve out 150 us to hold off traffic to perform the receiver re-optimization.

The adaptation control logic 213 could enable receiver re-optimization at any time, even in middle of data traffic; however, certain data patterns could result in a mis-calibration of the receiver 200 since the content of data traffic sent over a link is typically unknown. The receiver re-optimization depends on the data being spectrally diverse and having different patterns that ensure that the calibration of equalizer 200 covers a wide variety of signals for the class of channels used. In a SAS link, the training pattern used for link initialization is the same spectrally diverse data pattern that is transmitted during idle periods. This pattern is transmitted during the idle periods to enable receiver synchronization and is utilized for receiver re-optimization.

Figure 3:
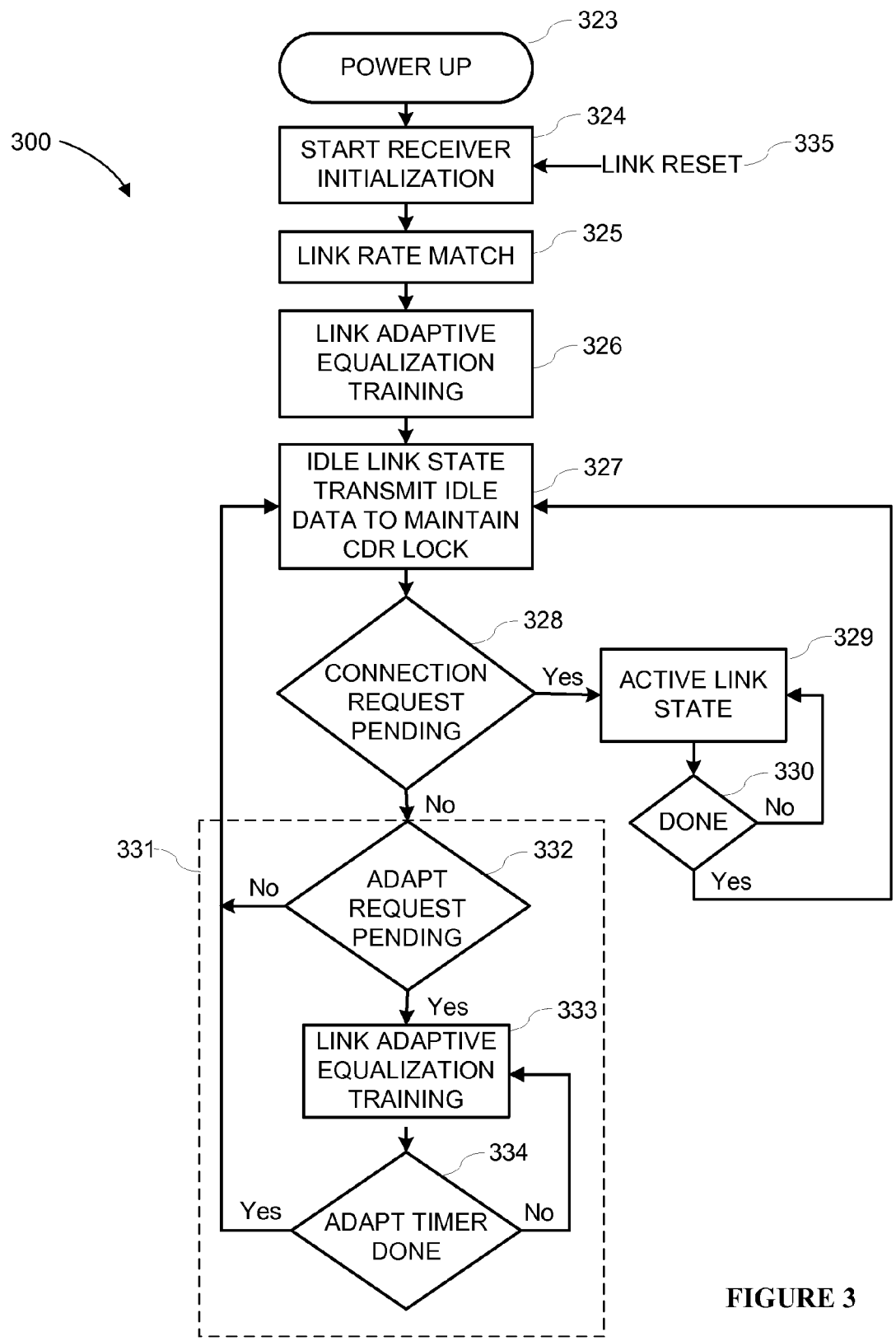
FIG. 3 is a flowchart of an illustrative process for adaptive equalization according to various embodiments of the invention.

FIG. 3 is a flowchart of an illustrative process for controlling a link as applied to adaptive equalization according to various embodiments of the invention.

Adaptive equalization in communications system begins at step 324 by initializing a receiver after the system is powered up at step 323. Alternatively, adaptive equalization may begin after the step of resetting links 335, for example after a power outage affecting the communications system and when equipment is replaced, or when the BER degrades to an unacceptable level.

At step 325, link rates are matched, for example by negotiating the highest supported clock speed at which the system can operate.

At step 326, an initial adaptive equalization training is performed by the receiver to calibrate receiver coefficients for any given hardware. Initial training optimizes the receiver coefficients to the characteristics of the channel. At this point, the individual links in the switch fabric are ready for traffic and expected to operate at the target Bit Error Rate (BER). During the training phase, the receiver keeps the link active and in compliance with specification.

At step 327, while the switch fabric is waiting for a connection request, each link transmits an idle random data pattern to enable receivers' clock and data recover units to maintain phase lock. The link enters the idle state each time the link is not active in a connection, i.e. not used by initiators to communicate to targets.

At step 328, the receiver determines whether a connection request is pending per protocol in the data traffic control logic. If the receiver determines that a connection request is pending, it is required to accept the connection request within a predetermined time, for example within 1 ms, according to protocol specifications.

Once the connection request has been received and accepted, at step 328, the link transitions to an active link state until the transfer is complete at step 330, when the link returns the idle state 327 and transmits idle data.

If no connection request is pending at step 328, then the receiver re-optimization phase begins at step 332 with the determination of whether an adaptation request is pending. The adaptation request may be periodically initiated by a timer or in response to a triggering event.

If an adaptation request is pending, then, at step 333, the control logic utilizes the connection for the time necessary to perform adaptive equalization training, for example, by using the current coefficients as initial values.

If a connection request occurs while the adaptation is active, the request is held off until the adaptation interval is complete. Typical specifications have a connection request timeout which is significantly longer than the adaptation interval. This enables the receiver control flow modification to be compliant with most specifications.

If no adaptation request is pending, the link returns to its idle state 327 and transmits idle data.

Finally, at step 334, the receiver determines whether adaptive equalization training has been completed, for example, by using an adapt timer 214. The receiver continues adaptive equalization training until adapt timer signals the end of the adaptive equalization training, at which time the link returns to its idle state 327 and transmits idle data.

For purposes of clarity, FIGS. 4 and 5 show typical sequences in which link initialization is performed in prior art systems. These prior art sequences are compared to FIG. 6, which illustrates an embodiment of the initialization sequence, to highlight certain features of various embodiments of the invention.

FIG. 4 is an illustration of a prior art sequence to initialize a link and transmit data over a communications channel. Although prior to link initialization 402-404 no transmission occurs, several preliminary steps may take place, including powering up, receiver initialization, and general setup. These preliminary steps do not involve transmissions in the link channel. The time period during which the link is disabled to permit the preliminary steps to complete is illustrated as 401.

Link initialization 402-404 begins when link rates are matched 402 by transmission of known data patterns for determining link parameters, such as available capacity or transmission rate of the channel. After the links are matched 402, the receiver begins equalizer training 404 to determine the optimal parameters for the channel characteristics. After link initialization ends, whenever data is not currently being transmitted, idle data 406 is transmitted in the form of predetermined idle patterns that comply with specifications to maintain synchronization of the Clock and Data Recover (CDR) circuits. Data is transmitted in a series of data packets 408, with idle data 406 being transmitted whenever a data packet is not transmitted. This approach assumes that once equalizer training 404 is completed and the settings of the equalizer are adapted, the settings remain optimal for the life of the receiver or until a power cycle forces re-initialization of the link (shown in FIG. 5) since, for example, SAS and PCIe specifications do not provision for additional training intervals or re-initialization of the link.

FIG. 5 is an illustration of a prior art sequence to initialize a link and transmit data over a communications channel and to re-initialize the link. Initialization proceeds in the same sequence as in FIG. 4. Prior to link initialization 501 no transmission occurs. Before any kind of transmission is made several steps may take place, including powering up, receiver initialization, and general setup. These preliminary steps do not involve transmissions in the link channel.

The time period of time during which the link is disabled to permit the preliminary steps to complete is illustrated as 501. Link initialization 502-504 begins when link rates are matched 502 by transmission of known data patterns for determining link parameters, such as available capacity or transmission rate of the channel. After the links are matched 502, the receiver begins equalizer training 504 to determine the appropriate parameters for the channel characteristics. After link initialization ends, whenever data is not currently being transmitted, idle data 506 is transmitted in the form of predetermined idle patterns that comply with specifications to maintain synchronization of the Clock and Data Recover (CDR) circuits. Data is transmitted in a series of data packets 508, with idle data being transmitted whenever a data packet is not transmitted.

An link reset and re-initialization may become necessary, for example when the system detects a bit-error-rate that exceeds a certain threshold. In this event the link is disabled to allow time for the setup steps required for re-initialization 510 to finish. This link re-initialization, similar to the first initialization, requires repeating many of the same steps such as rate matching 512 to determine available capacity or transmission rate of the channel and a lengthy repeat of equalizer training 514 to determine proper equalization parameters. The re-initialization 510-514 takes a significant period of time and is disruptive to the systems using the switch fabric. After re-initialization the link resumes its normal data traffic activities of transmitting or receiving data 518, or idle data 516 whenever a data packet 518 is not being sent.

FIG. 6 illustrates an exemplary adaptive equalization sequence according to various embodiments of the invention. Before any kind of transmission is made, several steps may take place, including powering up, receiver initialization, and general setup. These preliminary steps do not involve transmissions in the link channel. The time period during which the link is disabled to permit the preliminary steps to complete is illustrated as 601. Link initialization 602-604 begins when link rates are matched 602 by transmission of known data patterns for determining link parameters, such as available capacity or transmission rate of the channel.

Once the links are matched 602, the receiver begins equalizer training 604 to determine the optimal parameters for the channel characteristics. After link initialization ends, whenever data is not currently being transmitted, idle data 606 is transmitted in the form of predetermined idle patterns that comply with specifications to maintain synchronization of the Clock and Data Recover (CDR) circuits. Data is transmitted in a series of data packets 608, with idle data being transmitted whenever a data packet is not transmitted.

If after first initialization 601-604 a receiver re-optimization is triggered or scheduled, occasional short equalization training intervals 610 occur whenever an adaptation request is pending but a connection request is not pending. The equalization training intervals 610 are integrated into the active traffic and optimal receiver parameters can be maintained.

Since the equalization training intervals 610 is relatively short in duration when compared with link initialization 601-604, it is significantly less disruptive to switch fabric topologies than the prior art full re-initialization approaches, such as that illustrated by FIG. 5. This approach, while conforming to specifications, has a minimal impact on effective link throughput and operates at optimal link margin for a given receiver design when channels or systems are subjected to thermal and voltage variations.

It will be appreciated to those skilled in the art that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the claims in the future non-provisional application will include all such modifications, permutation and equivalents as fall within the true spirit and scope of the present invention.

We claim:

1. An adaptive equalizer apparatus located in a receiver, the apparatus comprising:
    adaptation control logic coupled within the receiver, the adaptation control logic triggers an adaptation analysis to determine whether a re-optimization process should be performed on a link and generates a start adaptation request;
    data traffic control logic coupled to communicate with the adaptation control logic, the data traffic control logic analyzes the link to identify an idle period in which the re-optimization process should be performed; and
    receiver adaptation logic coupled to communicate with the adaptation control logic, the receiver adaptation logic provides an adaptive equalization training within the receiver in response to the start adaptation request.

2. The apparatus according to claim 1, wherein the adaptation control logic is coupled to a timer used to trigger the adaptation analysis.

3. The apparatus according to claim 1, wherein the adaptation control logic is coupled to a monitor used to trigger the adaptation analysis.

4. The apparatus according to claim 3, wherein the monitor triggers the adaptation analysis based on detecting a change in at least one environmental parameter.

5. The apparatus according to claim 1, wherein the adaptive equalization training controls a linear equalizer and a decision feedback equalizer within the receiver.

6. The apparatus according to claim 5, wherein the linear equalizer comprises settings for a linear equalizer low-frequency gain, a linear equalizer high-frequency gain and a linear equalizer offset null, and wherein the decision feedback equalizer comprises settings for feedback tap weights.

7. A method for equalizing signals for communication over a communications channel, the method comprising:
   initializing a plurality of links in a network switch fabric by matching a plurality of link rates between at least a transmission device and a receiving device and performing an initial adaptive equalization training to calibrate the receiver to compensate for at least one characteristic of the communications channel;
   identifying a plurality of idle periods on the in plurality of links after initializing the plurality of links;
   transmitting a predetermined sequence of signals on the plurality of links in response to identified idle periods, the predetermined sequence of signals comprises components with high spectral diversity; and
   performing adaptive equalization training within the receiver, the adaptive equalization training comprising the steps of updating coefficients of the receiver in response to detecting both an absence of a connection request and a presence of an adaptation request.

8. The method of claim 7 further comprising the step of triggering an analysis on the plurality of links to identify the plurality of idle periods using a periodic timer.

9. The method according to claim 7 wherein the step of initializing the plurality of links comprises the steps of:
   locking the link to the receiver;
   handshaking across the link to initiate transmission;
   causing the transmitter to transmit the receiver information comprising a predetermined idle data pattern;
   determining whether there are errors in any of a plurality of coefficients of the receiver; and
   correcting errors in a plurality of coefficients of the receiver.

10. The method according to claim 9, wherein the idle pattern comprises a predetermined sequence of training signals that comprise components with high spectral diversity to maintain phase lock with the receiver.

11. The method according to claim 7, wherein the matching of a plurality of link rates comprises acquiring the plurality of link rates, negotiating a highest supported link speed, and deciding at which speed to operate.

12. The method according to claim 7, wherein the updating coefficients of the receiver uses a set of current coefficients as initial values.

13. The method according to claim 7, further comprising, in response to detecting a presence of the connection request, activating the plurality of initialized links until a transfer by the link is completed.

14. The method according to claim 7, wherein the adaptation request is generated by a triggering event.

15. A system for equalizing signals in a communications network, the system comprising:
   a transmitter; and
   a network switch fabric comprising a communications channel and a link to route communications between the transmitter and a receiver, the receiver comprising an adaptive equalizer to provide an adaptive equalization training to the receiver in response to detecting an idle period on the link after the link has been initialized.

16. The system according to claim 15, wherein the adaptive equalizer is coupled to a timer used to trigger an adaptive equalization training request.

17. The system according to claim 16, wherein the timer periodically triggers the adaptive equalization training request.

18. The system according to claim 15, wherein the adaptive equalizer is coupled to a monitor used to trigger an adaptive equalization training request.

19. The system according to claim 18, wherein the monitor triggers the adaptation equalization training request based on detecting a change in at least one environmental parameter capable of changing a characteristic of the communications channel.

* * * * *